United States Patent
Derunov et al.

(10) Patent No.: US 10,720,244 B2
(45) Date of Patent: Jul. 21, 2020

(54) FUEL ROD CLADDING, FUEL ROD AND FUEL ASSEMBLY

(71) Applicant: Joint Stock Company "AKME-Engineering", Moscow (RU)

(72) Inventors: Viacheslav Vasilievich Derunov, Obninsk (RU); Viktor Mihailovich Mayorov, Obninsk (RU); Pavel Andreevich Pomeschikov, Obninsk (RU); Aleksander Evgenievich Rusanov, Obninsk (RU); Aleksandr Alekseevich Smirnov, Obninsk (RU); Sergey Viktorovich Shulepin, Obninsk (RU); Said Mirfaisovich Sharikpulov, Barvikha (RU)

(73) Assignee: Joint Stock Company "AKME-Engineering", Moscow (RU)

( * ) Notice: Subject to any disclaimer, the term of this patent is extended or adjusted under 35 U.S.C. 154(b) by 271 days.

(21) Appl. No.: 15/021,698

(22) PCT Filed: Jun. 3, 2014

(86) PCT No.: PCT/RU2014/000407
§ 371 (c)(1),
(2) Date: Mar. 13, 2016

(87) PCT Pub. No.: WO2015/076697
PCT Pub. Date: May 28, 2015

(65) Prior Publication Data
US 2016/0225468 A1 Aug. 4, 2016

(30) Foreign Application Priority Data
Nov. 19, 2013 (RU) ................. 2013151156

(51) Int. Cl.
*G21C 3/06* (2006.01)
*G21C 3/08* (2006.01)
(Continued)

(52) U.S. Cl.
CPC ............... *G21C 3/08* (2013.01); *G21C 1/03* (2013.01); *G21C 3/07* (2013.01); *G21C 3/12* (2013.01);
(Continued)

(58) Field of Classification Search
CPC ..... G21C 3/32; G21C 3/02; G21C 3/04; G21C 3/12; G21C 3/322; G21C 3/326
See application file for complete search history.

(56) References Cited

U.S. PATENT DOCUMENTS 3,282,335 A    11/1966   De Haller et al.
4,011,133 A *   3/1977   Bloom ................. C22C 38/44
                                                                         376/172
(Continued)

FOREIGN PATENT DOCUMENTS

EP       1693855 A2 *   8/2006   ............. C21D 6/002
GB      1046147         10/1966
(Continued)

OTHER PUBLICATIONS

An English Machine Translation of АЛександр Викторович Батулин et al., RU2003130354A, published on Apr. 10, 2005.*

(Continued)

*Primary Examiner* — Marshall P O'Connor
(74) *Attorney, Agent, or Firm* — Preston Smirman; Smirman IP Law, PLLC

(57) ABSTRACT

Systems for controlling and protecting nuclear reactors. A drive of an emergency safety rod of a nuclear reactor includes an electric drive, a reduction gear, and a rack-and-
(Continued)

Figure 1:
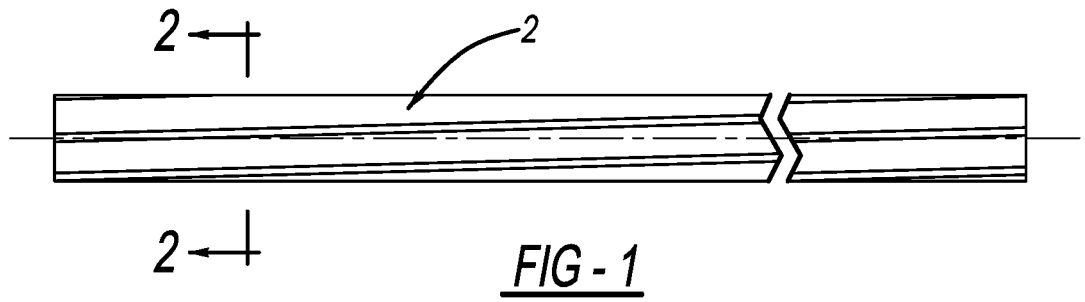

pinion gear. The electric drive contains a contactless electric motor based on permanent magnets, which is installed in the housing of the electric drive with a motor rotor position sensor, and a reduction gear for changing the rate of rotation of the electric drive. A toothed rack is installed along the axis of the rack-and-pinion gear in order to provide for the reciprocating motion of a system absorber rod connected thereto. A toothed electromagnetic clutch having a contactless current supply is installed on an inner shaft of the rack-and-pinion gear, enabling the rigid and simultaneous mechanical coupling of half-couplings, and the drive contains a reverse-motion coupling, a rack-separation spring and toothed rack position sensors.

3 Claims, 1 Drawing Sheet

(51) Int. Cl.
  *G21C 3/07*   (2006.01)
  *G21C 1/03*   (2006.01)
  *G21C 3/12*   (2006.01)
  G21C 3/04   (2006.01)
  G21C 21/02   (2006.01)
  G21C 3/30   (2006.01)

(52) U.S. Cl.
  CPC ............... *G21C 3/04* (2013.01); *G21C 3/30* (2013.01); *G21C 21/02* (2013.01); *Y02E 30/40* (2013.01)

(56) References Cited

U.S. PATENT DOCUMENTS

2002/0150197 A1* 10/2002 Yamada .................. G21C 3/32
                     376/449
2013/0322591 A1* 12/2013 Bashkirtsev ............. G21C 3/08
                     376/426

FOREIGN PATENT DOCUMENTS

| | | |
|---|---|---|
| GB | 1459562 | 12/1976 |
| JP | S63434 | 1/1988 |
| JP | H0216394 | 6/1990 |
| RU | 38421 | 6/2004 |
| RU | 2267175 | 4/2005 |
| RU | 2298848 | 5/2007 |

OTHER PUBLICATIONS

English Abstract of JPH0216394.
English Abstract of RU2267175.
English Abstract of RU38421.
English Abstract of JPS63434.
International Search Report dated Aug. 21, 2014.
Translation of International Search Report dated Aug. 21, 2014.
Written Opinion of the International Searching Authority dated Aug. 21, 2014.
Translation of Written Opinion of the International Searching Authority dated Aug. 21, 2014.
International Preliminary Report on Patentability dated May 24, 2016.

* cited by examiner

FUEL ROD CLADDING, FUEL ROD AND FUEL ASSEMBLY

CROSS-REFERENCE TO RELATED APPLICATION

The instant application is a national phase of PCT International Application No. PCT/RU2014/000407 filed Jun. 3, 2014, and claims priority to Russian Patent Application Serial No. 2013151156, filed Nov. 19, 2013, the entire specifications of both of which are expressly incorporated herein by reference.

FIELD OF THE INVENTION

The invention relates to the field of nuclear energy and may be used in the manufacture of fuel rods (FR) and fuel assemblies (FA) for reactors with a heavy liquid metal coolant (HLMC), as well as in the manufacture of FR simulators to be used in irradiation devices for real FR performance testing.

PRIOR ART

Prior art includes a wide range of fuel rods with cladding designed as a metallic tubular element made of an HLMC-resistant metal or alloy, with at least one rib arranged helically and protruding out of the surface of the tubular element (see. abstract of Publication JPH02163694). The FR according to this patent comprises a cladding with pellets of uranium oxide and plutonium and plugs installed at the ends. Spiral ribs of the cladding are integrated with the tubular element with a predetermined height and number of turns along the entire length of the tube on its outer surface. The ribs help to maintain the distance between the FRs during operation, and allow to achieve improved heat dissipation.

Unfortunately, the abstract does not reveal the composition of the material of the fuel rod cladding and configuration of the ribs, which does not allow to judge the performance of the fuel rod, in particular, its resistance to HLMC.

Patent RU2267175 discloses a ribbed FR cladding made of aluminum for use in IRT type research reactors. Each cladding is equipped with four spiral spacer ribs, and each rib has a rectangular cross-section.

The patent also discloses the FR itself which comprises the said aluminum cladding with spiral spacer ribs on the outer surface, sealed with plugs at the ends, with a fuel core inside.

The patent also discloses a fuel assembly comprising a casing with these fuel rods and spacing grids for their installation inside.

Disadvantages of the prior art include low resistance of fuel rods and assemblies in heavy liquid metal melts, which is primarily due to the aluminum low melting point of 660° C.

Furthermore, the rectangular profile cross-section according to the known patent will cause high stress concentrations at the interface of the ribs with the cladding, which will also lead to loss of stability in the HLMC.

The technical solution closest to the proposed one is disclosed in Patent GB 1459562.

According to this patent, the cladding is a tubular element made of stainless steel, on the outer side of the same, there is at least one helical rib. This rib is a spiraled wire (or twin wire) wound helically around the tubular element.

Accordingly, the patent also discloses the fuel rod itself comprising a cladding and nuclear fuel in the form of uranium carbide, and an assembly comprising such elements.

According to the method description, the formation of ribs in form of a coiled spring wire allows to attach the ribs as a spiraled wire only in certain fastening points and not as a continuous line. This allows to avoid coolant stagnation at the interfaces of the ribs and the tubular element, which provides more efficient coolant movement along the FR. At the same time, according to the authors of the invention, the design of the ribs will have an acceptable rigidity for the ribs to perform their spacing functions.

Unfortunately, the known patent does not specify how the ribs are attached, but the attachment may be performed by spot welding.

However, stainless steels have limited weldability. During resistance spot welding, shrink holes and hot cracks may appear in the weld spot metal that may propagate in the cladding material. Attachment of the wire to the cladding by means of resistance welding leads to defects in the cladding.

Additionally, the spring-coiled wire fixed at certain points will shift in the coolant flow along the fuel rod height and break away from the cladding in welding spots.

INVENTION DISCLOSURE

The objective of the invention is an improvement in the performance characteristics of fuel rods and assemblies as a result of the long-term resistance of the cladding in the environment of a heavy liquid metal coolant such as lead or a eutectic of lead and bismuth.

The technical result of the invention is an improvement in the performance characteristics of fuel rods and assemblies as a result of the long-term resistance of the cladding in the environment of a heavy liquid metal coolant such as lead or a eutectic of lead and bismuth. Additional technical results include manufacturability of the fuel rod cladding, reduction of the core hydraulic resistance and intensification of heat exchange processes due to easier flow of the HLMC along the ribs. In addition, technical results include a decrease in stress concentration and reduced risk of defects at the rib base due to the mode of production and subsequent operation of FR, and, therefore, elimination of FR corrosion damage.

The following essential features influence the achievement of the above technical results.

The FR cladding for reactors with a heavy liquid metal coolant is a solid-rolled tubular element with spiraled ribs located on the outer surface of the said element made of chrome silicon steel of the ferritic-martensitic grade with a grain size of ferrite of not less than 7 under GOST 5639, and the cross-sectional shape of the rib is trapezoid with an opening angle between 22° and 40°, and the cross-sectional shape of the rib is trapezoid with rounded corners at the top and with smoothed corners (fillet) at the base of the trapezoid.

In particular embodiments of the invention, the cladding is made of steel with chromium content between 10 wt % and 12 wt % and silicon content between 1.0 wt % and 1.3 wt %.

In the preferred embodiments of the invention, the cladding may have four spiraled ribs equally spaced.

In this case each rib has a height of at least 0.75 mm, wall thickness 5 of maximum 0.6 mm and rib opening angle between 30° and 40°.

In other embodiments, the cross-sectional shape of the ribs is a trapezoid with rounded corners at the top of the trapezoid, with a curvature radius of 0.2-0.35 mm.

The cross-sectional shape of the ribs may be a trapezoid with smoothed corners at the base of the trapezoid with a fillet radius of 0.55-0.9 mm.

The problem set is also solved by means of a fuel rod for reactors with a heavy liquid metal coolant comprising the described cladding sealed at the ends with plugs and nuclear fuel inside the cladding.

The problem set is also solved by a fuel assembly for reactors with a heavy liquid metal coolant comprising a basic frame structure and at least one retention grid installed on the same with fuel rods manufactured using the above essential features and fixed in the retention grid.

At the same time, spacing of fuel rods is carried out on a "rib-to-rib" basis.

The assembly may comprise two retention grids located at the top and bottom of the frame.

The frame may be designed as a tube.

LIST OF FIGURES

Figure 2:
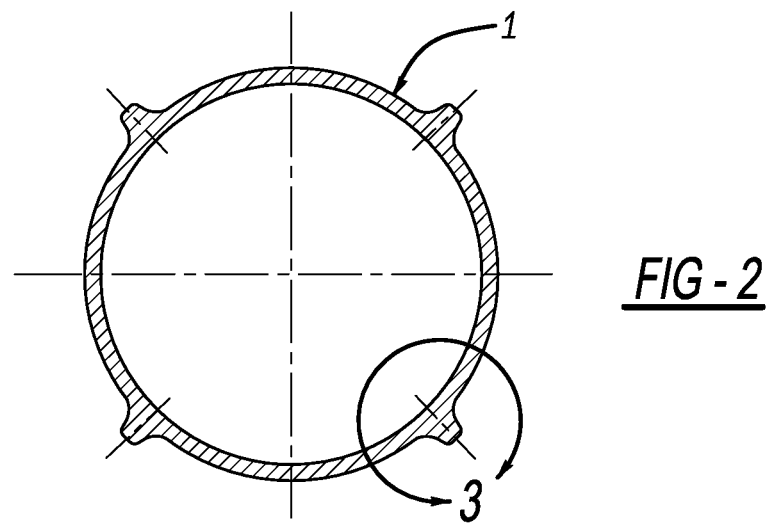
Figure 3:
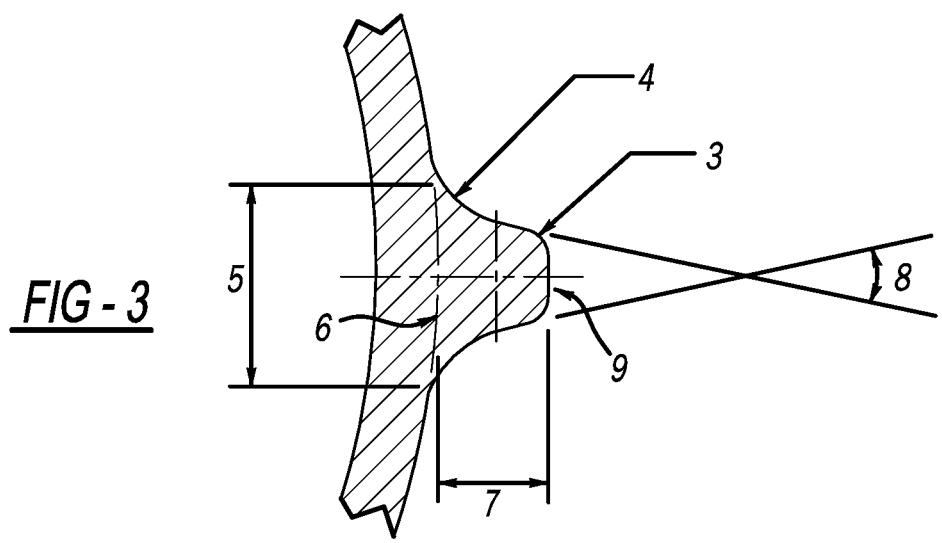

The claimed invention is illustrated by drawings, where FIG. 1 shows the cladding appearance, FIG. 2 shows the cladding cross-section, FIG. 3 shows the rib cross-section.

IMPLEMENTATION OF THE INVENTION

The items are as follows:
1. FR cladding.
2. Spacing spiral ribs.
3. Rounded corner at the rib top.
4. Smoothed corner at the rib bottom.

The cladding 1 (see FIG. 1-FIG. 2) is a solid-rolled tubular element with spacing spiral ribs 2 located on the outer surface of the cladding 1.

The cladding 1 is made of chrome silicon steel of the ferritic-martensitic grade with ferrite grain size of not less than 7 under GOST 5639 and has an outer crest diameter between 9.8 mm and 13.5 mm, the thickness of the cladding is between 0.38 mm and 0.55 mm, the cladding internal diameter is between 7.2 mm and 11.2 mm, the inner and outer surface roughness does not exceed Ra=1.2 µm under GOST 2789.

In the preferred embodiments, steel 16H12MVSFBR-SH (EP823-SH) is used as the chrome silicon steel of ferritic-martensitic grade. This steel has the following composition, wt %: carbon 0.14-0.18, silicon 1.0-1.3, manganese 0.5-0.8, chrome 10.0-12.0, nickel 0.5-0.8, vanadium 0.2-0.4, molybdenum 0.6-0.9, tungsten 0.5-0.8, niobium 0.2-0.4, boron 0.006 (as per calculation), cerium <0.1 and the remainder is iron.

In terms of service properties (high resistance to vacancy swelling, low rate of radiation creep, high corrosion resistance in lead-bismuth), steel EP823-SH is the most suitable material for FR claddings of reactors with a heavy liquid metal coolant.

The number of ribs mat vary.

In the preferred embodiment of the invention, the cladding includes 4 ribs.

Each rib 2 (see FIG. 3) protrudes above the cladding and is a trapezoid with rounded peaks and rounded corners at the base 6 (fillet) in cross-section. The rib opening angle is between 22° and 40°, in the most preferred embodiments, between 30° and 40°.

Such rib configuration ensures manufacturability of the FR cladding, allows to reduce the core hydraulic resistance and intensifies heat exchange processes due to the easier HLMC flow along the ribs. In addition, design of the ribs with rounded peaks and fillets at the interface with the cladding allows to decrease stress concentrations and risk of defects at the rib base due to the mode of production and subsequent operation of FR, and, therefore, to eliminate corrosion damage of FR.

The preferred cladding parameters are as follows:
cladding wall thickness of maximum 0.6 mm, preferably 0.4 mm;
rib height 7 between 0.55 mm and 0.85 mm, preferably 0.75 mm;
opening angle between 22° and 40°, preferably 30°;
corner curvature radius 3 at the top 9 between 0.2 mm and 0.35 mm, preferably 0.2 mm;
fillet radius 4 at the bottom between 0.55 mm and 0.9 mm, preferably 0.7 mm.

Ribs 2 are equally spaced, each one is spiraled with a pitch between 450 mm and 1000 mm, preferably 750 mm. Preferably, the cladding 1 is made with left-hand winding of ribs.

EMBODIMENT EXAMPLE

A tube with 4 spiral ribs was fabricated by cold rolling of billets made of steel EP823-SH for manufacture of the fuel claddings.

The cladding crest diameter is 13.5 mm, cladding wall thickness is 0.4 mm, cladding inner diameter is 11.2 mm. The ribs have a height of 0.75 mm, rib half-height width is 0.75 mm, rib height-to-thickness ratio is 1.85 mm. The cross-section of the rib was a trapezoid with rounded corners at the trapezoid top with a curvature radius of 0.2 mm, fillet radius of 0.7 mm. The rib opening angle was 30°. The ribs were spiraled with a pitch of 750 mm (left-hand winding).

Nuclear fuel based on uranium dioxide was placed in the manufactured cladding and the manufactured FRs were sealed with upper and lower tail pieces (plugs).

To complete the fuel assembly, the assembled FRs were installed in the frame structure with the spacing on a "rib-to-rib" basis and attached in the upper, intermediate and lower grid mounted on the frame structure. The resulting assembly was installed in the reactor.

The invention allows to manufacture a cladding with ribs as a single unit, and to reduce the probability of defects in stress concentration spots, which ensures stable heat and corrosion resistance in contact with the HLMC at operating temperatures.

The invention allows to implement spacing of adjacent fuel rods (rib-to-rib) between the upper and lower support (for FR) spacer grids of the FA, spacing with reflector and FA support elements (which allows to simplify the FA design) and to ensure long-term stability in the HLMC medium (lead, eutectic alloy of lead and bismuth), subject to appropriate HLMC process (about 75,000 hours), temperature and dose limits for FR cladding.

The invention claimed is:
1. A fuel rod assembly, comprising:
a fuel rod;
wherein the fuel rod includes a cladding;
wherein the cladding includes a weldless, solid-rolled tubular element with spiraled ribs located on an outer surface of the fuel rod and is made of chrome silicon steel with a ferrite grain size of less than 0.0336 mm;
wherein an opening angle of each rib is between 30° and 40° and a cross-sectional shape of the rib is a trapezoid with rounded corners at a top portion of the trapezoid and with smoothed corners at a base portion of the trapezoid;
wherein the fuel rod is sealed at ends thereof and nuclear fuel is placed inside the cladding;
wherein each rib has a height of at least 0.75 mm and a wall thickness of a maximum of 0.6 mm;
wherein the trapezoid has a curvature radius of 0.2-0.35 mm;
wherein the trapezoid has a fillet radius of 0.55-0.9 mm;
wherein the fuel rod assembly is operable to be used in a reactor with a heavy liquid metal coolant, wherein the heavy liquid metal coolant includes lead or a lead-bismuth mixture.

2. The fuel rod assembly according to claim 1, wherein the cladding is made of steel with a chromium content between 10 wt % and 12 wt % and a silicon content between 1.0 wt % and 1.3 wt %.

3. The fuel rod assembly according to claim 1, wherein the cladding has four spiraled ribs that are equally spaced apart.

\* \* \* \* \*